United States Patent [19]

Hamada et al.

[11] Patent Number: 5,309,231
[45] Date of Patent: May 3, 1994

[54] ADAPTIVE ENCODING SYSTEM OF MOVING PICTURE FRAME

[75] Inventors: Takahiro Hamada; Masahiro Saito; Syuichi Matsumoto, all of Saitama, Japan

[73] Assignee: Kokusai Denshin Denwa Co., Ltd., Tokyo, Japan

[21] Appl. No.: 897,104

[22] Filed: Jun. 11, 1992

[30] Foreign Application Priority Data

Jun. 14, 1991 [JP] Japan ................................. 3-168993

[51] Int. Cl.$^5$ ............................................. H04N 7/133
[52] U.S. Cl. ..................................... 348/404; 348/420
[58] Field of Search ........................ 358/133–135, 358/136; 382/43; H04N 7/133

[56] References Cited

U.S. PATENT DOCUMENTS

| | | | |
|---|---|---|---|
| 5,006,931 | 4/1991 | Shirota | 358/133 |
| 5,073,821 | 12/1991 | Juri | 358/133 |
| 5,144,424 | 9/1992 | Savatier | 358/133 |
| 5,146,324 | 9/1992 | Miller | 358/133 |

Primary Examiner—Howard W. Britton
Attorney, Agent, or Firm—Armstrong, Westerman, Hattori, McLeland & Naughton

[57] ABSTRACT

A frame of a picture is first divided into a plurality of blocks, each of which is subject to orthogonal transform to provide picture pels in the form of matrixes, which have a coefficient of DC component, and coefficients of AC components. AC components in said matrix are subject to a pre-quantization for each frame evaluate total code length (L') in the encoding. A number (N') of significant coefficients which are not zero in each block or each macro block is counted. A step size in quantization is determined according to said values L' and N' and coefficient position. The quantized block is subject to effective baseband selection for further reduction of information amount so that a zero coefficient after EOB in the block along the selected scanning line defined by the selected effective baseband is eliminated. If the information amount after the eliminating of zero coefficients still exceeds a preferable bit rate, a high order coefficient in the matrix is further eliminated, so that a picture frame is encoded into a predetermined fixed bit rate.

7 Claims, 1 Drawing Sheet

ADAPTIVE ENCODING SYSTEM OF MOVING PICTURE FRAME

BACKGROUND OF THE INVENTION

1. Field of the Invention

The present invention relates to an adaptive encoding system of a moving picture signal and, in particular, relates to a system which uses an orthogonal transform for each small blocks in a picture frame.

2. Description of the Related Art

In a prior art system which encodes a picture signal through orthogonal transform, a picture frame is divided into a plurality of small blocks, each of which is subject to orthogonal transform to provide transformed signal matrix. The coefficients in the matrix are quantized, and encoded into a variable length code. In this case, in order to reduce bit rate of encoded picture signal so that a quantized picture frame is transmitted through a transmission circuit of a predetermined fixed bit rate, a step size of a quantizer is selected through feedback system which has a buffer memory for storing matrixes. The step size is systematically determined so that the memory does not overflow. In other words, when the memory is not near capacity, a small step size is selected to provide a fine picture, and when the memory is near capacity, a large step size is selected to provide a coarse picture.

However, the prior art system has the disadvantage in fast processing that the selection of a step size is subject to time delay because of feedback loop in a memory circuit operation, and the memory is subject to overflow. When the memory overflows, the step size must be considerably large, so that picture quality is much deteriorated.

Another disadvantage of the prior art system is that the information reduction in encoding is insufficient.

Still another disadvantage of the prior art system is that the step size does not depend upon the picture pattern.

SUMMARY OF THE INVENTION

It is an object of the present invention to provide a new and improved encoding system of a moving picture by overcoming the disadvantages and limitations of a prior art encoding system.

It is also an object of the present invention to provide an encoding system of a moving picture in which the information amount or bit rate for transmission is much reduced.

It is also an object of the present invention to provide an encoding system of a moving picture in which a bit rate depends upon a picture pattern, and picture quality is not deteriorated in spite of great reduction of bit rate.

It is also an object of the present invention to provide an encoding system of a moving picture in which a fast processing hardware for implementing the bit rate reduction is simple The above and other objects are attained by an adaptive encoding system of moving picture signal, comprising: an orthogonal transform means (1) for effecting orthogonal transform for each block in an input picture frame, to provide signal matrix for each block; a buffer memory (2) for storing said signal matrixes of a picture frame; a pre-quantizer (3) for carrying out provisional quantization of a picture frame stored in said memory (2) and providing total code length L' of a picture frame, and number M' of pels showing number of coefficients to be transmitted depending upon value L'; precounting means (4) of significant coefficients for counting number N' of significant coefficients in each block; step size selection means (5, 6) for selecting step size in quantization according to said values L' and N'; a quantizer (7) for quantizing picture signal stored in said memory (2) with the step size determined by said step size selection means (5, 6).

BRIEF DESCRIPTION OF THE DRAWINGS

The foregoing and other objects, features, and attendant advantages of the present invention will be appreciated as the same become better understood by means of the following description and drawings wherein.

DESCRIPTION OF THE PREFERRED EMBODIMENTS

Figure 1:
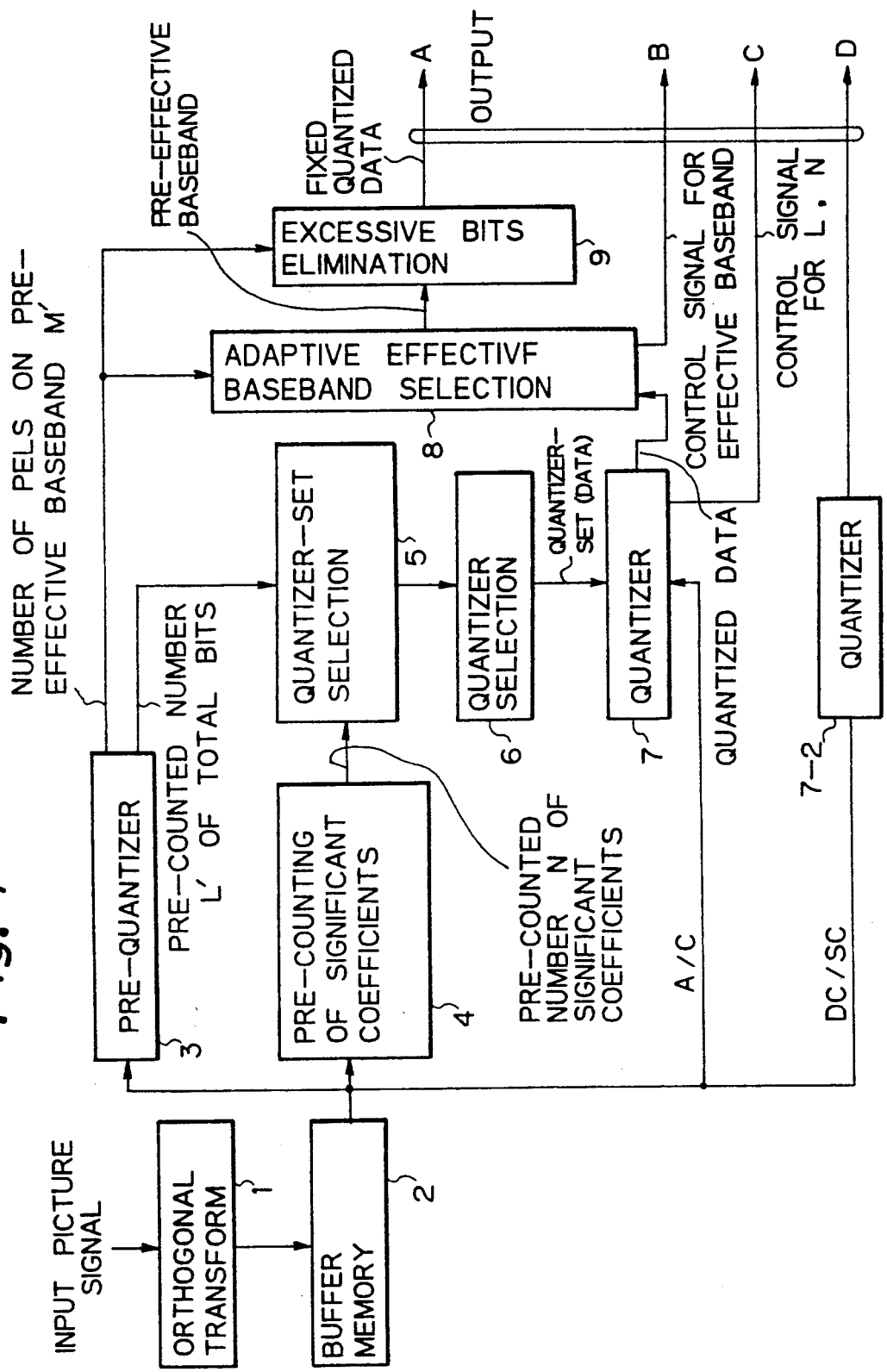
FIG. 1 shows a block diagram of an encoder according to the present invention.

The present invention has the following three schemes for reducing information amount or bit rate in encoding a moving picture A) Adaptive selection of step size of a quantizer.

B) Adaptive effective baseband selection.

C) Excessive bits elimination of high order coefficients.

FIG. 1 shows a block diagram of an encoder according to the present invention. In the figure, the numeral 1 is an orthogonal transform, which provides the orthogonal transform for each block in an input picture frame. Each block has, for instance, 8×8 pels or picture cells, and the orthogonal transform is effected to each block. The example of the orthogonal transform is a Hadamard transform. The transformed block has also 8×8 pels $P_{ij}$ as shown in the table 1 (i and j are 0 through 7 in the embodiment).

TABLE 1

| |
|---|
| $P_{00}, P_{01}, P_{02}, P_{03}, P_{04}, P_{05}, P_{06}, P_{07}$ |
| $P_{10}, P_{11}, P_{12}, P_{13}, P_{14}, P_{15}, P_{16}, P_{17}$ |
| $P_{20}, P_{21}, P_{22}, P_{23}, P_{24}, P_{25}, P_{26}, P_{27}$ |
| $P_{30}, P_{31}, P_{32}, P_{33}, P_{34}, P_{35}, P_{36}, P_{37}$ |
| $P_{40}, P_{41}, P_{42}, P_{43}, P_{44}, P_{45}, P_{46}, P_{47}$ |
| $P_{50}, P_{51}, P_{52}, P_{53}, P_{54}, P_{55}, P_{56}, P_{57}$ |
| $P_{60}, P_{61}, P_{62}, P_{63}, P_{64}, P_{65}, P_{66}, P_{67}$ |
| $P_{70}, P_{71}, P_{72}, P_{73}, P_{74}, P_{75}, P_{76}, P_{77}$ |

The coefficient $P_{00}$ is called the DC (direct current) coefficient, and other coefficients through $P_{01}$ through $P_{77}$ are called AC coefficients. The coefficients $P_{33}$ and $P_{34}$ are usually assigned to a sub-carrier (SC) in a television signal transmission. A coefficient having small values of i and/or j is called a low order coefficient, and greatly affects picture quality. A coefficient having large values of i and/or j is called a high order coefficient, and does not greatly affect picture quality. The present invention handles the encoding of the AC coefficients. The DC coefficients, and/or SC coefficients are encoded with no bit rate elimination through a conventional art.

A macro block is defined by a plurality of blocks, and for instance, a macro block has 4 (=2×2) blocks.

The numeral 2 is a buffer memory of orthogonal transform coefficients for storing pels of a frame of picture.

The numeral 3 is a pre-quantizer which is a conventional quantizer for quantizing the content of the memory 2 based upon transmit bit rate and obtaining the provisional total code length L in a frame of a picture.

The code length L' is defined as the total code length for each block or each macro block. The value L' is obtained by dividing L by the number of blocks or the number of macro blocks in a frame.

The number M' which is a provisional number of transmit pels in each block, is determined according to the code length L'. When a picture signal is transmitted through a limited bit rate line, some pels which do not affect much to picture quality are omitted for transmission. When L' is small, M' is determined to be large, and when L' is large, M' is determined to be small. The examples of the value M' is M'=50 for L'=100, and M'=64 for L'=20.

The numeral 4 is a pre-counting of significant coefficients for providing the number N' of significant coefficients in a block. The significant coefficient is defined a coefficient which exceeds a predetermined threshold. The threshold is, for instance, zero, and in this case, the number N' is the number of pels which are not zero in a block, or a macro block.

The number N' is counted for each block and the step size is determined for each block, alternatively, said number N' is counted for each macro block and the step size is determined for each macro block.

The numeral 5 is a quantizer set selection which selects a set of quantizers or a set of step sizes of a quantizer for the current code length L'.

It should be appreciated, of course, that when a step size is small, a fine highly detailed picture is obtained and the information amount is large, and when a step size is large, picture quality is poor and the information amount is small.

The numeral 6 is a quantizer set which selects a quantizer or a step size of a quantizer among the set of quantizers selected by the quantizer set selection 5, according to the current value N'.

Thus, it should be appreciated that a quantizer or a step size of a quantizer is selected based upon the values L' and N' for each block, or for each macro block.

In one modification, a quantizer or a step size of a quantizer depends upon not only L' and N', but also the location (values i and j) of a pel to be quantized.

The numeral 7 is a quantizer of variable length code for quantizing a picture pel stored in the memory 2 by using the selected quantizer or the selected step size. The quantizer 7 provides the quantized pel, together with the control signals for L' and N', which are used in reproducing stage.

The sequence of the quantization of the pels is arbitrary in this state. For instance, the quantization is carried out from the first line to the last line, and from the left column to the right column in each line of the matrix.

The numeral 8 is an adaptive effective baseband selection which eliminates some bits in the output of the quantizer 7, by eliminating non-significant (a pel of zero, for instance) in high order positions in a matrix. The number of pels to be eliminated depends upon an effective base band, or sequence of quantization of pels in a block.

The numeral 9 is an excessive bit elimination which eliminates some bits in the output of the adaptive effective baseband selection 8, so that the bit rate of a quantized picture is within a predetermined fixed bit rate for each frame.

The DC coefficient and/or SC (sub-carrier) coefficients are quantized separately by another quantizer 7-2.

The orthogonal transform 1 carries out the orthogonal transform for each block of a picture in an original picture signal frame, and an alternate (A/C) coefficients of the matrixes of the transformed signal are quantized.

The pre- quantizer 3 carries out first quantization for the A/C coefficients (excluding SC coefficients) included in the current picture frame stored in the memory 2 into variable length code, using a conventional quantizer depending upon a transmit bit rate, and provides a code length L' in encoding the current picture frame. The value L' shows the amount of information in each block of the current picture frame.

The code length L' is used to determine the quantizer or the step size of the quantizer.

The value L' determines the number M' which shows how many coefficients in a block is to be transmitted. The value M' is used in the adaptive effective baseband selection 8 and the excessive bit elimination 9.

The pre-counting of significant coefficients 4 counts the number N' of significant coefficients in a block or a macro block. The significant coefficient is defined to be the value of a coefficient larger than a predetermined threshold. The threshold is determined high for low order coefficient of a matrix, and low for high order coefficient. Alternatively, the threshold may be zero for all the coefficient.

The number N' of significant coefficients shows how much a block or a macro block includes high frequency coefficient. When the number N' is large reflecting much high frequency coefficient, a noise in a picture is not visible, and a coarse quantizer or a large step size may be used. On the other hand, when the number N' is small, a noise in a picture is visible, and a fine quantizer or a small step size of a quantizer must be used. Thus, a quantizer is adaptively switched for each block or each macro block, and variable length encoding is carried out.

The quantizer set selection 5 selects one set of a quantizer set according to the total code length L', and one quantizer in the selected quantizater set is selected according to the number N' of the significant coefficient.

In a modification, the selection of a quantizer or a step size of a quantizer is possible by using only L' or only N'.

The quantizer-set selection 5, and a quantizer-set 6 are implemented by a ROM (read only memory), which stores a quantizer-set, or a quantizer in each address which is designated by L' and N'.

The quantizer 7 quantizes or encodes the A/C coefficient of matrix in each block or each macro block, by using the designated quantizer or designated step size of a quantizer. The sequence of the pels of the quantization is arbitrary at this stage. The quantizer 7 outputs not only the quantized picture data, but also the value of L' and N' as control signals.

The DC coefficient and the SC coefficients are quantized by another quantizer 7-2 with fine step size.

The adaptive effective baseband selection 8 selects the effective baseband of A/C coefficients in each block or each macro block. The adaptive effective baseband selector 8 has a plurality of candidate patterns or scanning sequences of an effective baseband according to a local feature of a picture pattern. Some examples of the patterns are (A) a moving picture with color, (B) a moving picture with no color, (C) a still picture with color, and (D) a still picture with no color. Said selector 8 calculates the number of significant coefficients in each pattern along the scanning line defined by each effective baseband until the M'th coefficient. Said number M' is given for each block or macro block by the pre-quantization 3 according to the code length L'. And, the pattern which has the minimum number Y of zero coefficients in the M' number of coefficients is selected.

The number Y of zero coefficient is calculated by Y=EOB-N, where EOB is the number of the last non-zero coefficients in the scanning in each pattern, and N is the number of non-zero coefficients in the effective baseband.

The transmission of pels in each block or each macro block is effected until the EOB (end of block) pel, and a pel located after the EOB along the scanning line is not transmitted.

Therefore, it should be noted that the selection of the effective baseband is the change of the quantization sequence of pels according to the selected effective baseband. As the location of EOB depends upon each effective baseband, and no pel after the EOB is transmitted, the proper selection of the effective baseband reduces the information amount of the quantized picture.

When the effective baseband or the scanning pattern is selected, the quantized data in the selected pattern or the selected scanning sequence is forwarded to the excessive bits elimination circuit 9. The baseband selection circuit 8 outputs also the control signal showing which baseband or pattern is selected.

When the bit rate of the signal of the output of the effective baseband selection circuit 8 exceeds the predetermined value defined by a fixed bit rate transmission line, the excessive bits elimination circuit 9 eliminates the some bits in each block or each macro block one by one starting from the high order coefficient which is higher than M'th coefficient along the scanning sequence but lower than the EOB.

When the bit rate of the quantized frame is still higher than a predetermined value after all the coefficients higher than M'th coefficient of all the blocks or all the macro blocks are eliminated, a coefficient lower than M'th coefficient is eliminated in each block or each macro block, starting from high order coefficient.

In this case, since low order coefficient is important for picture quality, a limiter is provided to protect a coefficient of lower order having the value i and/or j smaller than a predetermined value. The elimination of coefficients is effected so that the coefficients higher than said limiter are first eliminated.

When the bit rate of the quantized signal is still higher than a predetermined value after all the coefficients higher that said limiter is eliminated, coefficients within the limiter are eliminated starting from the higher coefficients, until the bit rate reaches a predetermined value.

Finally, a quantized picture signal within the allowable bit rate with excellent picture quality is obtained.

The final outputs of the present encoder are; A) quantized pels in matrix form, B) control signal of selection of effective baseband; C) control signal for L' and N', and D) quantized pels for DC coefficients and SC coefficients.

As described above, according to the present invention, a pre-quantization is carried out for each frame before a final quantization so that an estimated information amount L' is obtained. Then, a step size of quantization is determined according to the value L', and the number N' of the significant coefficients in a block or a macro block, so that the bit rate or the information amount of a quantized picture signal is the minimum while keeping good picture quality.

Next, the effective baseband is adaptively selected for each block or each macro block. As the transmission of a picture signal is effected only until EOB coefficient, the proper selection of the effective base eliminates the quantized information amount.

Then, the excessive bits are eliminated so that the bit rate is within the predetermined value, keeping a picture quality degradation as least as possible.

Finally, some numerical embodiments are shown.

Table 2 shows an example of content of a quantizer set selection 5, and a quantizer selection 6, which are implemented by a ROM (read only memory).

Table 3 shows the relation of $Q_k$ which is used in the table 2, and the coordinates of a pel (see table 1).

For instance, when the code length L' for each block is 50 (L'=0-100), and N' is 15, the pel $P_{03}(Q3)$ is quantized with the step size 1, and the pel $P_{15}$ (Q6) is quantized with the step size 10. In this case, it is assumed that each pel to be quantized may have the range from $-1024$ to $+1024$. Of course, a small step size for quantization provides less quantization noise.

Table 4 shows the example of scanning sequence in the effective baseband. In the first baseband A which is suitable for a moving color picture, the sequence is $P_{01}$-$P_{10}$-$P_{70}$-$P_{02}$-$P_{20}$-$P_{11}$-.

TABLE 2

| N' | Q1 | Q2 | Q3 | Q4 | Q5 | Q6 | Q7 | Q8 | Q9 | Q10 | Q11 | Q12 |
|---|---|---|---|---|---|---|---|---|---|---|---|---|
| L' = 0-100 | | | | | | | | | | | | |
| 0-20 | 1 | 1 | 1 | 2 | 4 | 10 | 12 | 15 | 13 | 25 | 25 | 25 |
| 21-50 | 1 | 1 | 1 | 2 | 3 | 14 | 15 | 15 | 25 | 25 | 25 | 25 |
| 51 85 | 1 | 1 | 1 | 2 | 3 | 5 | 7 | 15 | 25 | 25 | 25 | 25 |
| 86-256 | 1 | 3 | 3 | 3 | 3 | 6 | 9 | 25 | 25 | 25 | 25 | 25 |
| L' = 101-110 | | | | | | | | | | | | |
| 0-20 | 1 | 1 | 2 | 2 | 4 | 14 | 15 | 15 | 13 | 25 | 25 | 25 |
| 21-50 | 1 | 2 | 3 | 4 | 5 | 18 | 18 | 15 | 25 | 25 | 25 | 25 |
| 51 85 | 2 | 3 | 5 | 6 | 6 | 10 | 16 | 15 | 25 | 25 | 25 | 25 |
| 86-256 | 2 | 5 | 6 | 6 | 8 | 13 | 18 | 25 | 25 | 25 | 25 | 25 |
| L' = 111-120 | | | | | | | | | | | | |
| 0-20 | 1 | 2 | 4 | 5 | 6 | 18 | 18 | 15 | 13 | 25 | 25 | 25 |
| 21-50 | 2 | 3 | 4 | 5 | 7 | 22 | 21 | 15 | 25 | 25 | 25 | 25 |
| 51 85 | 2 | 4 | 5 | 7 | 9 | 16 | 25 | 15 | 25 | 25 | 25 | 25 |
| 86-256 | 4 | 7 | 10 | 12 | 15 | 20 | 26 | 25 | 25 | 25 | 25 | 25 |

TABLE 3

(The relations of Q1–Q12, and the coefficients $P_{ij}$ in case of 8 × 8 matrix)

| DC | Q1 | Q2 | Q3 | Q4 | Q4 | Q5 | Q5 |
|---|---|---|---|---|---|---|---|
| Q1 | Q2 | Q3 | Q5 | Q12 | Q6 | Q6 | Q7 |
| Q2 | Q3 | Q5 | Q11 | Q9 | Q12 | Q7 | Q7 |
| Q3 | Q5 | Q11 | SC | SC | Q9 | Q7 | Q7 |
| Q4 | Q6 | Q6 | Q6 | Q7 | Q7 | Q7 | Q7 |
| Q4 | Q6 | Q6 | Q7 | Q7 | Q7 | Q7 | Q7 |
| Q8 | Q10 | Q7 | Q7 | Q7 | Q7 | Q7 | Q7 |
| Q1 | Q8 | Q10 | Q10 | Q7 | Q7 | Q7 | Q7 |

TABLE 4 (A)

The scanning pattern for the effective baseband A (moving color picture)

| DC | 1 | 4 | 13 | 20 | 22 | 24 | 27 |
|---|---|---|---|---|---|---|---|
| 2 | 6 | 15 | 25 | 29 | 31 | 34 | 38 |
| 5 | 16 | 28 | 12 | 11 | 36 | 40 | 43 |
| 14 | 26 | 9 | SC | SC | 8 | 45 | 48 |
| 21 | 30 | 33 | 37 | 42 | 47 | 50 | 52 |
| 23 | 32 | 35 | 41 | 46 | 51 | 54 | 56 |
| 10 | 19 | 39 | 44 | 49 | 55 | 58 | 59 |

TABLE 4 (A)-continued

The scanning pattern for the effective baseband A
(moving color picture)

| 3 | 7 | 17 | 18 | 53 | 57 | 60 | 61 |

TABLE 4 (B)

The scanning pattern for the effective baseband B
(moving monochrome picture)

| DC | 1  | 4  | 9  | 16 | 18 | 20 | 23 |
|----|----|----|----|----|----|----|----|
| 2  | 6  | 11 | 21 | 49 | 47 | 43 | 41 |
| 5  | 12 | 24 | 25 | 26 | 45 | 39 | 37 |
| 10 | 22 | 27 | SC | SC | 28 | 46 | 51 |
| 17 | 29 | 30 | 32 | 48 | 42 | 40 | 53 |
| 19 | 31 | 33 | 34 | 44 | 38 | 36 | 56 |
| 8  | 15 | 35 | 50 | 52 | 55 | 58 | 59 |
| 3  | 7  | 13 | 14 | 54 | 57 | 60 | 61 |

From the foregoing it will now be apparent that a new and improved adaptive encoding system has been found. It should be understood of course that the embodiments disclosed are merely illustrative and are not intended to limit the scope of the invention. Reference should be made to the appended claims, therefore, rather than the specification to indicating the scope of the invention.

What is claimed is:

1. An adaptive encoding system of moving picture signal comprising:
    an orthogonal transform means for effecting orthogonal transform for each block in an input picture frame, to provide signal matrix for each block;
    a buffer memory for storing said signal matrices of a picture frame;
    a pre-quantizer for carrying out provisional quantization of a picture frame stored in said memory and providing total code length $L'$ of a picture frame, and number $M'$ of pels showing number of coefficients to be transmitted depending upon value $L'$;
    pre-counting means of significant coefficients for counting number $N'$ of significant coefficients in each block;
    step size selection means for selecting step size in quantization according to said values $L'$ and $N'$; and
    a quantizer for quantizing the picture signal stored in said memory with the step size determined by said step size selection means.

2. An adaptive encoding system according to claim 1, further comprising:
    an adaptive effective baseband selection means for selecting an effective baseband for among predetermined basebands so that number $Y$ of non-significant coefficients in an $M'$ number of coefficients along scanning line defined by an effective baseband is a minimum, and transmission of a picture is effected until EOB pel along said scanning line in each block or each macro block; and
    an excessive bits elimination means for eliminating excessive bits in an output of said adaptive effective baseband selection means so that a coefficient is eliminated one by one staring from high order coefficient, to provide a bit rate of an encoded signal within a predetermined value.

3. An adaptive encoding system according to claim 1, wherein said block has $8 \times 8$ picture pels, and said orthogonal transform is Hadamard transform.

4. An adaptive encoding system according to claim 1, wherein step size of quantization is selected for each block.

5. An adaptive encoding system according to claim 1, wherein step size of quantization is selected for each macro block which has a plurality of blocks.

6. An adaptive encoding system according to claim 1, wherein said significant coefficient is defined as a coefficient which has value larger than a predetermined threshold value.

7. An adaptive encoding system according to claim 6, wherein said predetermined threshold value is zero.

* * * * *